US011949185B2

(12) United States Patent
Oosaka et al.

(10) Patent No.: US 11,949,185 B2
(45) Date of Patent: Apr. 2, 2024

(54) CONNECTOR AND CONNECTOR ASSEMBLY

(71) Applicant: Japan Aviation Electronics Industry, Limited, Tokyo (JP)

(72) Inventors: Junji Oosaka, Tokyo (JP); Yohei Yokoyama, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 122 days.

(21) Appl. No.: 17/713,202

(22) Filed: Apr. 4, 2022

(65) Prior Publication Data

US 2022/0368063 A1 Nov. 17, 2022

(30) Foreign Application Priority Data

| | | |
|---|---|---|
| May 17, 2021 | (JP) | 2021-082870 |
| May 24, 2021 | (JP) | 2021-086800 |
| May 24, 2021 | (JP) | 2021-086902 |
| Jun. 21, 2021 | (JP) | 2021-102193 |

(51) Int. Cl.
*H01R 13/518* (2006.01)
*H01R 13/6581* (2011.01)
*H01R 43/16* (2006.01)

(52) U.S. Cl.
CPC ....... *H01R 13/518* (2013.01); *H01R 13/6581* (2013.01); *H01R 43/16* (2013.01)

(58) Field of Classification Search
CPC ... H01R 13/518; H01R 13/6581; H01R 43/16
USPC .......................................................... 439/364
See application file for complete search history.

(56) References Cited

U.S. PATENT DOCUMENTS

2010/0068900 A1 3/2010 Wu et al.

FOREIGN PATENT DOCUMENTS

| | | | | | |
|---|---|---|---|---|---|
| CN | 209344360 U | * | 9/2019 | | |
| CN | 211126218 U | | 7/2020 | | |
| CN | 212485720 U | * | 2/2021 | | |
| CN | 112636035 A | * | 4/2021 | | H01R 12/716 |
| JP | 2015050132 A | * | 3/2015 | | H01R 12/7082 |
| JP | 2018060818 A | * | 4/2018 | | |
| JP | 2019135726 A | * | 8/2019 | | |
| JP | 2019139938 A | * | 8/2019 | | |
| JP | 6638873 B1 | * | 1/2020 | | H01R 12/7005 |

(Continued)

*Primary Examiner* — Peter G Leigh
(74) *Attorney, Agent, or Firm* — Muncy, Geissler, Olds & Lowe, P.C.

(57) ABSTRACT

Provided is a connector and a connector assembly with improved properties of a frame while the number of components is further reduced. The connector can be fitted with a counter connector and includes: a frame including a side wall which surrounds the counter connector; a first terminal and a second terminal which are situated inside the frame; and a blocking portion disposed between the first terminal and the second terminal. The side wall seamlessly continues over an entire periphery of the frame, the frame and the blocking portion are constituted of a same member to be integrated with each other, the blocking portion has a joint portion which joins one end portion to another end portion of the frame, and the joint portion is fixed to the board while being in contact with the board continuously from the one end portion to the other end portion of the frame.

14 Claims, 18 Drawing Sheets

(56) References Cited

FOREIGN PATENT DOCUMENTS

| | | | | | |
|---|---|---|---|---|---|
| JP | 2020129569 | A | * | 8/2020 | |
| JP | 6813621 | B2 | * | 1/2021 | |
| WO | WO-2020040004 | A1 | * | 2/2020 | ......... H01R 12/7005 |
| WO | WO-2021020533 | A1 | * | 2/2021 | ............. H01R 12/71 |

* cited by examiner

CONNECTOR AND CONNECTOR ASSEMBLY

BACKGROUND OF THE INVENTION

The present invention relates to a connector which can be fitted with a counter connector, and a connector assembly configured such that the connector is fitted with the counter connector.

An example of a connector which can be fitted with a counter connector is a connector (hereinafter called "connector 1") described in the specification of CN 211126218 U (hereinafter called "Patent Literature 1"). The connector 1 is a receptacle connector shown in FIG. 21 and has a frame 3 of a rectangular tube shape provided at its one end with an opening 2. A counter connector (not shown) enters an inside of the frame 3 through the opening 2, whereby the connector 1 is fitted with the counter connector.

Signal transmitting terminals 4 shown in FIG. 21 are disposed inside the frame 3, and the frame 3 blocks an electromagnetic interference from an outside to the terminals 4. The frame 3 is formed by processing a metal sheet in some cases, and the frame 3 shown in FIG. 22 is obtained by performing drawing process on a metal sheet. Since the frame 3 shown in the drawing seamlessly continues in its circumferential direction, it is excellent in strength and blocking property.

Inside the frame 3, as shown in FIG. 22, a blocking portion 5 may be disposed between the terminals 4 separately disposed at positions different from each other. The blocking portion 5 is an electromagnetic shield and suppresses an interference, specifically crosstalk between the terminal 4.

SUMMARY OF THE INVENTION

It is preferable that a connector can be assembled more easily, and as the number of constitutional components of the connector is smaller, the connector can be assembled more easily and with lower cost. Therefore, the development of a connector with the smaller number of components is desired.

Further, when the frame 3 has a seamless structure as shown in FIGS. 21 and 22, the strength of the frame 3 can be improved, but further improvement of the strength is required. In particular, a force may act to move the connector in a direction intersecting a fitting direction of the connector, and it is important to enhance the strength against such a force for the purpose of improving the quality of the connector.

The present invention has been made in view of the above circumstances and is aimed at attaining an object described below. The present invention is to solve the conventional problem and to provide a connector and a connector assembly with improved properties of a frame while the number of components is further reduced.

In order to attain the above object, the connector of the present invention is a connector which can be fitted with a counter connector in a first direction and is fixed to a board, the connector comprising: a frame including a side wall which surrounds the counter connector in a state where the connector is fitted with the counter connector; a first terminal and a second terminal which are situated inside the frame and separately disposed at positions different from each other in a second direction intersecting the first direction; and a blocking portion which is disposed between the first terminal and the second terminal in the second direction, wherein the side wall seamlessly continues over an entire periphery of the frame, wherein the frame and the blocking portion are constituted of a same member to be integrated with each other, wherein the blocking portion has a joint portion which joins one end portion to another end portion of the frame in a third direction intersecting each of the first direction and the second direction, and wherein the joint portion is fixed to the board while being in contact with the board continuously from the one end portion to the other end portion of the frame.

According to the present invention, since the side wall of the frame seamlessly continues over the entire periphery of the frame, the strength and the blocking property of the frame are ensured.

In addition, since the side wall and the blocking portion of the frame are constituted of a same member to be integrated with each other, the number of components is further reduced. As a result, an assembly operation of the connector is more facilitated, and production cost of the connector can be reduced.

Further, the joint portion provided in the frame is fixed to the board while being in contact with the board continuously over the range from one end portion to the other end portion of the frame in the third direction. Thus, even if a force acts to move the connector in the third direction, the frame can satisfactorily resist the force. As a result, the strength of the connector can be more enhanced.

In addition, in order to attain the object described above, the connector assembly of the invention is a connector assembly configured such that a connector fixed to a board is fitted with a counter connector in a first direction, the connector assembly comprising: a frame including a side wall which surrounds the counter connector in a state where the connector is fitted with the counter connector; a first terminal and a second terminal which are situated inside the frame and separately disposed at positions different from each other in a second direction intersecting the first direction; and a blocking portion which is disposed between the first terminal and the second terminal in the second direction, wherein the side wall seamlessly continues over an entire periphery of the frame, wherein the frame and the blocking portion are constituted of a same member to be integrated with each other, wherein the blocking portion has a joint portion which joins one end portion to another end portion of the frame in a third direction intersecting each of the first direction and the second direction, and wherein the joint portion is in contact with the board continuously over a range from the one end portion to the other end portion of the frame.

In the above-described connector assembly of the present invention, the strength and the blocking property of the frame included in the connector can be ensured while the number of components constituting the connector is further reduced. In addition, the strength of the connector with respect to a force to move the connector in the third direction can be enhanced.

DETAILED DESCRIPTION OF THE INVENTION

A connector and a connector assembly according to the invention are described below with reference to a configuration example shown in the appended drawings. However, the embodiment described below is only an example presented for easy understanding of the invention, and the invention is by no means limited thereto. In other words, the invention may be modified or improved from the embodiment described below without departing from the scope and spirit of the invention.

The materials, shapes, design dimensions and other factors of components constituting the connector assembly of the invention can be determined depending on the application of the invention, the state of the art at the time when the invention is carried out, and other conditions. Needless to say, the invention includes its equivalents.

In addition, in the following description, three directions intersecting orthogonally to one another are defined as an X direction, a Y direction and a Z direction. The Z direction is a vertical direction of each of the connector and the connector assembly and corresponds to a fitting direction of the connector and the counter connector, i.e., a first direction. In the following description, the +Z side is treated as the upper side of the connector and the connector assembly. Here, the +Z side is a side on which the counter connector is situated when viewed from the connector in the Z direction.

The Y direction is a front-back direction of each of the connector and the connector assembly, intersects, more specifically intersects orthogonally to each of the X direction and the Z direction, and corresponds to a second direction.

The X direction is a lateral width direction of each of the connector and the connector assembly, intersects, more specifically intersects orthogonally to the Z direction, and corresponds to a third direction.

In this description, meaning of the terms "orthogonal" or "parallel" encompasses an error range generally allowed in the technical field of the invention and includes a case where a shift within a range of less than a few degrees (e.g., 2 to 3 degrees) with respect to an exact orthogonality or parallel is present.

For convenience of description, in the following description, fitting of the connector to the counter connector is called "connector fitting," and the state where the connector is fitted with the counter connector is called "connector fitting state."

<<Configuration Example of Connector Assembly>>

Figure 6:
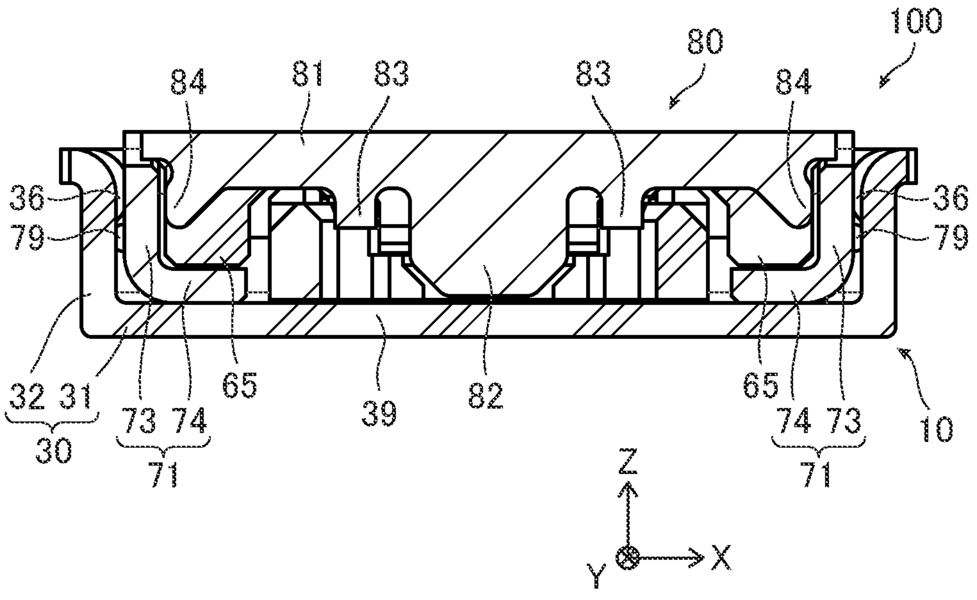
FIG. 6 is a view showing a cross-section taken along I-I in FIG. 5.
Figure 7:
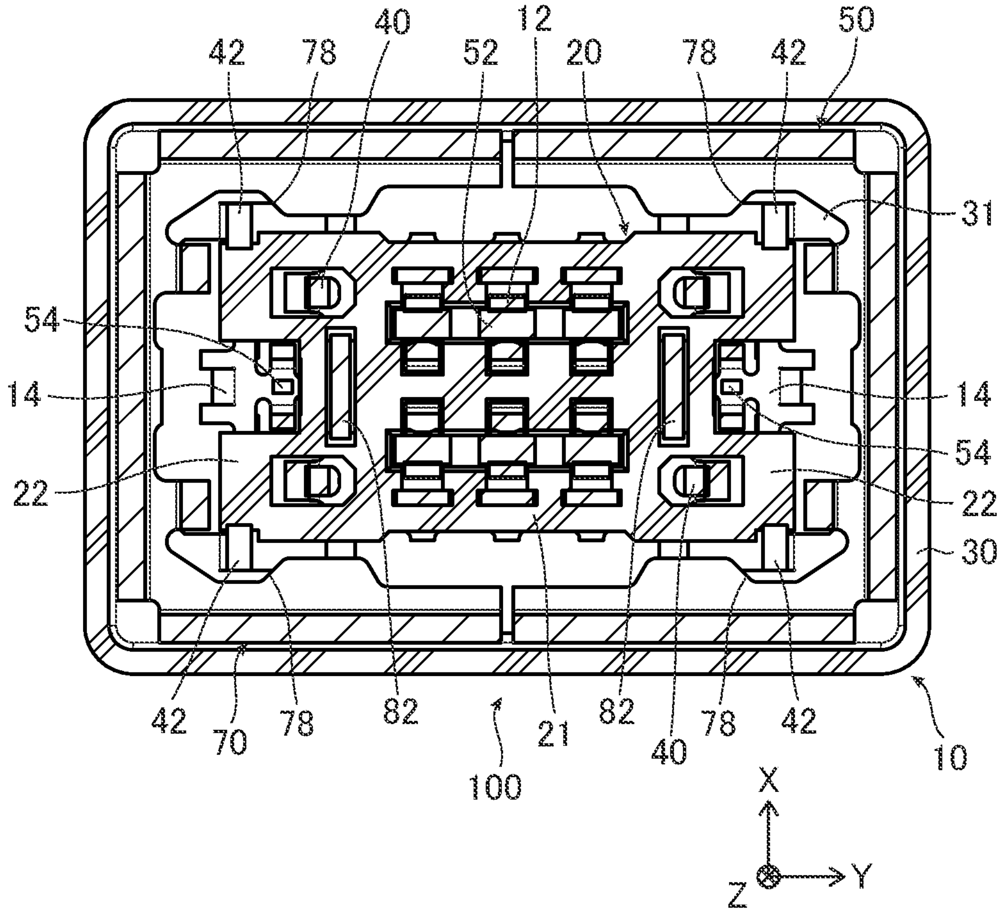
FIG. 7 is a view showing a cross-section taken along J-J in FIG. 5.

A configuration of a connector assembly according to an embodiment of the present invention (hereinafter, referred to as "connector assembly 100") is outlined with reference to FIGS. 1 to 7. FIG. 6 shows a cross-section taken along I-I in FIG. 5, and the I-I cross-section is an XZ plane passing a counter blocking portion 80 to be described later. FIG. 7 shows a cross-section taken along J-J in FIG. 5, and the J-J cross-section is an XY plane passing fixing protruding portions 42 to be described later.

Figure 1:
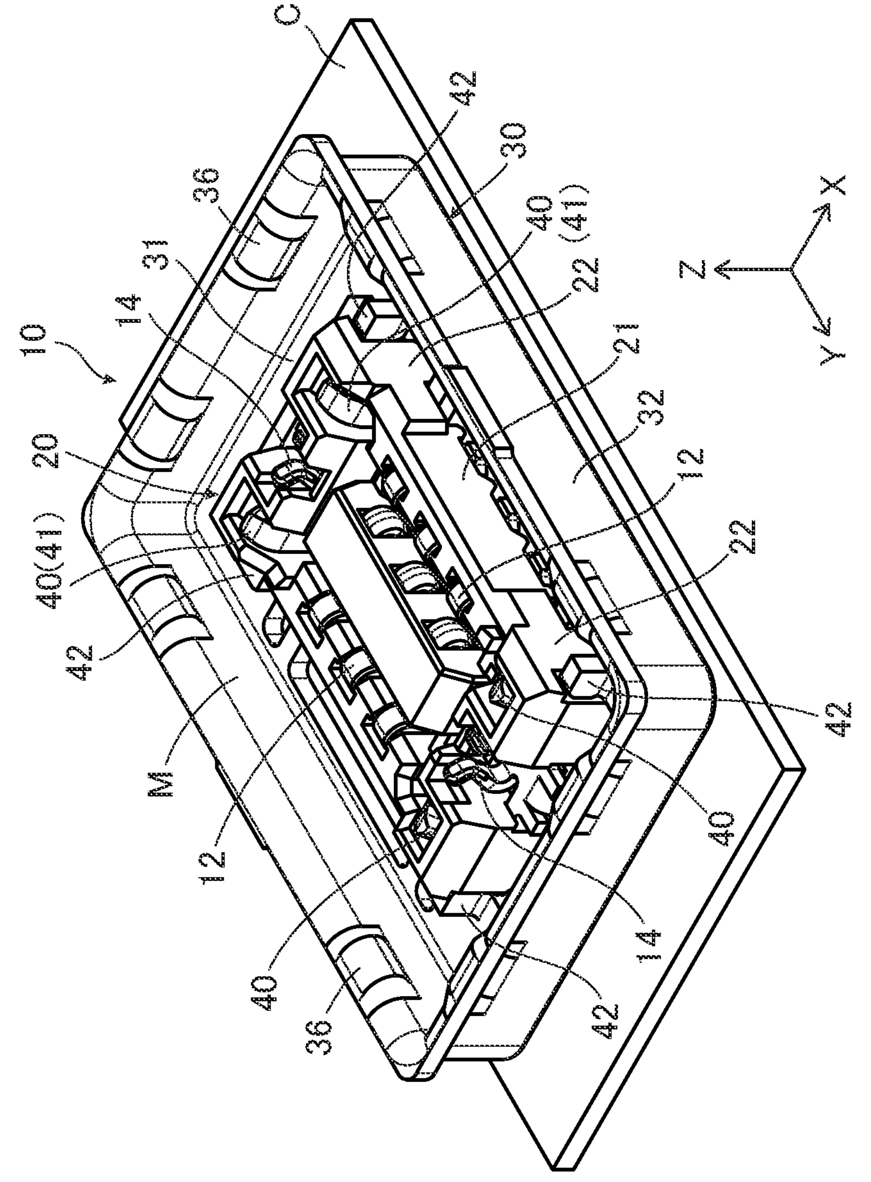
FIG. 1 is a perspective view of a connector according to an embodiment of the present invention.
Figure 2:
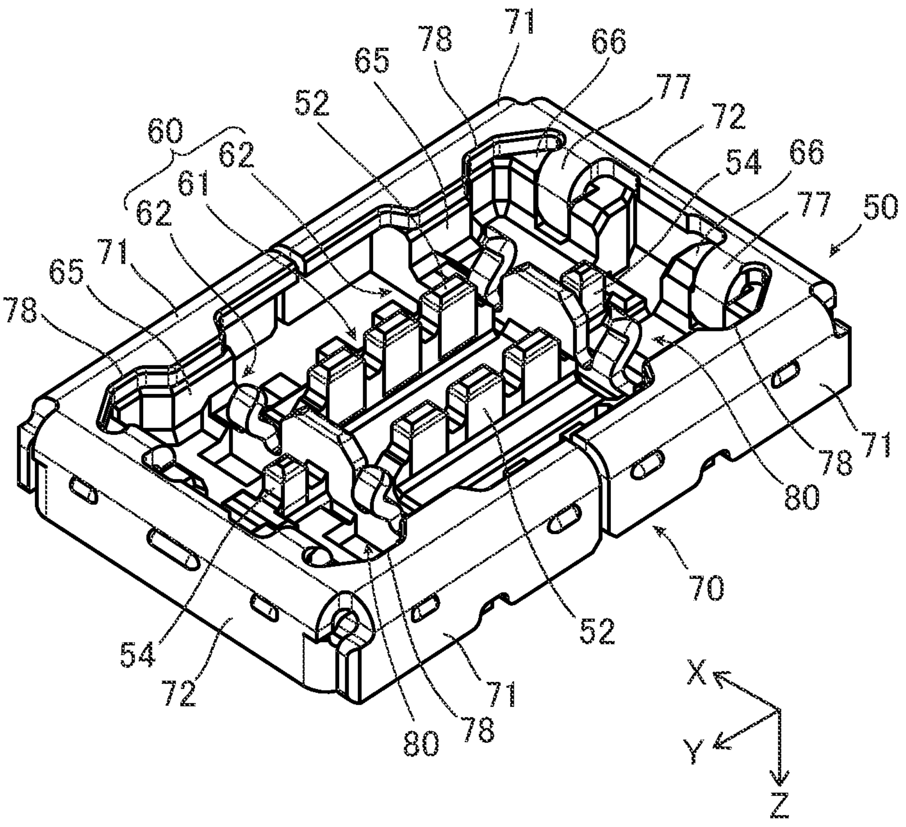
FIG. 2 is a perspective view of a counter connector according to the embodiment of the present invention.

The connector assembly 100 includes constitutional elements, i.e., a connector 10 shown in FIG. 1 and a counter connector 50 shown in FIG. 2. In the connector assembly 100, the connector 10 is a receptacle connector, while the counter connector 50 is a plug connector. The counter connector 50 enters an inside of a frame 30 included in the connector 10 so that the connectors are fitted with each other, whereby the connector assembly 100 is configured. The structure of each of the connector 10 and the counter connector 50 is briefly described below.

(Connector)

The connector 10 can be fitted with the counter connector 50 in the Z direction, and as shown in FIG. 1, a lower end (end on the −Z side) of the connector 10 is fixed to a surface of a board C with solder. The connector 10 has appearance of a substantially rectangular shape in a plan view and extends longer in the Y direction than in the X direction. The connector 10 is configured to be symmetrical with respect to its center position in each of the X direction and the Y direction.

As shown in FIG. 1, the connector 10 includes signal transmitting contacts 12, 14, a housing 20 holding the contacts 12, 14, the frame 30 surrounding the housing 20, and blocking portions 41 each constituting an electromagnetic shield 120.

The contact 12 is held at a housing center portion 21 which is a center portion of the housing 20 in the Y direction, and is a low-frequency signal transmitting or power-feeding contact. In the configuration shown in FIG. 1, a plurality of (e.g., six) contacts 12 are held at the housing center portion 21.

The contact 14 is held at each of housing end portions 22 which are end portions of the housing 20 in the Y direction, and is a high-frequency signal transmitting contact, i.e., a radio frequency (RF) terminal. The high frequency is equivalent to, for instance, a frequency band of not lower than 6 GHz and is a frequency band including a 28 GHz band used for the 5th generation (5G).

In the connector 10 shown in FIG. 1, the contact 14 is singly held at each of the housing end portions 22 on the +Y side and the −Y side. The contact 14 on the +Y side and the contact 14 on the −Y side form a pair and are separately disposed at positions different from each other in the Y direction. One contact 14 corresponds to a first terminal, and the other contact 14 corresponds to a second terminal. The pair of contacts 14, 14 are disposed at the same position or separately disposed at positions different from each other in the X direction.

The housing 20 is a molded product made of an insulating resin material and is disposed inside the frame 30 while holding the contacts 12, 14 described above. That is, the contacts 12, 14 of the connector 10 are situated inside the frame 30.

Figure 3:
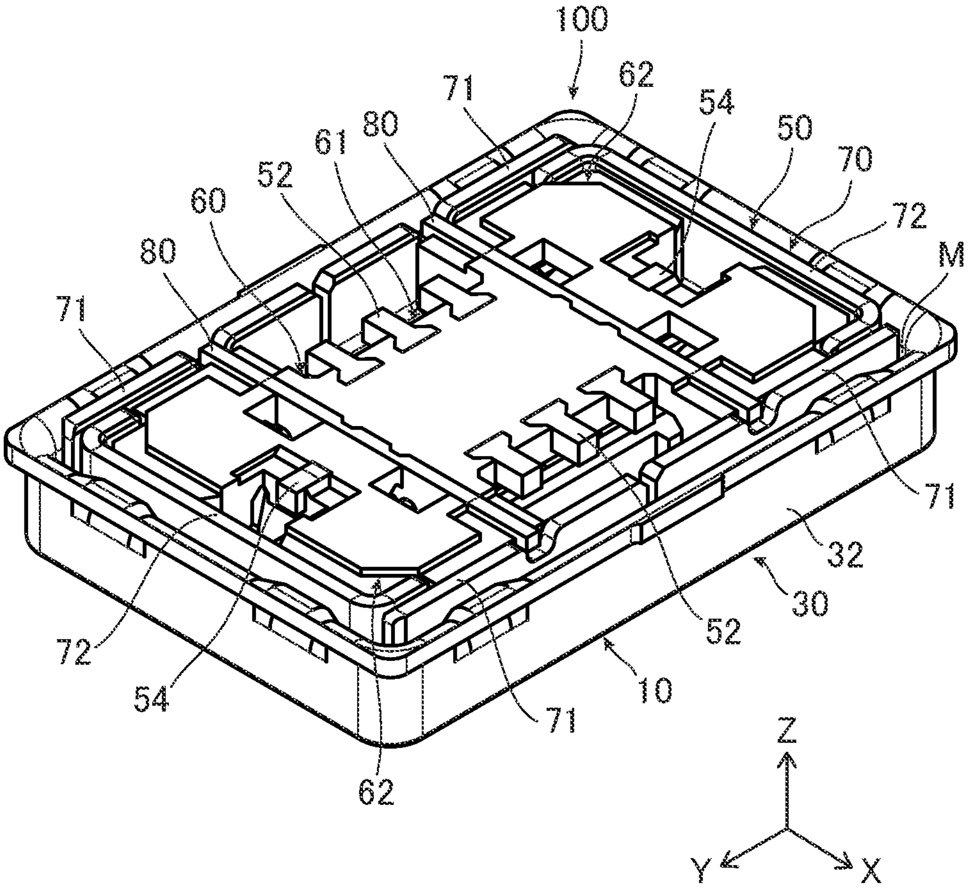
FIG. 3 is a perspective view of a connector assembly according to the embodiment of the present invention.
Figure 4:
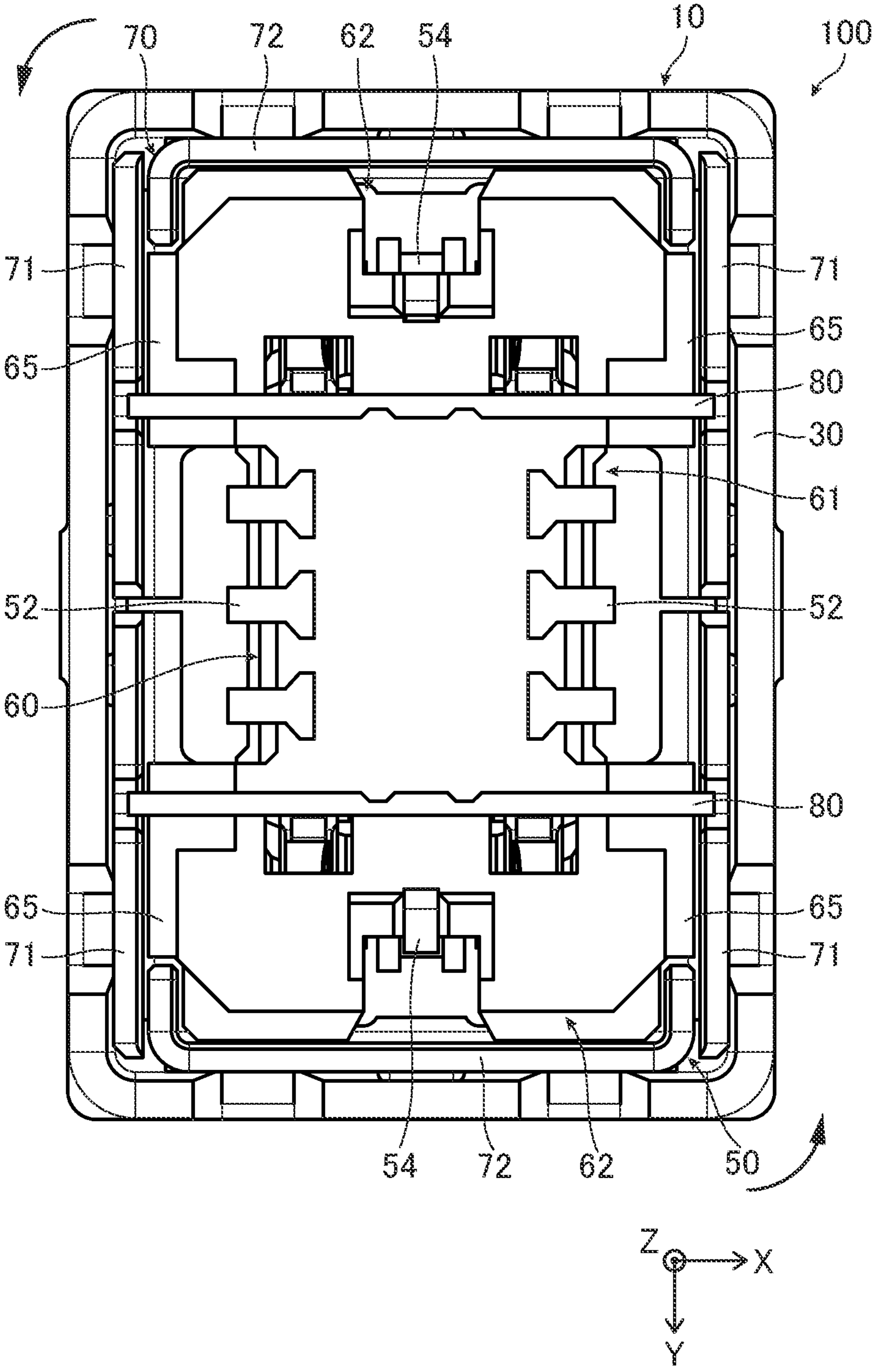
FIG. 4 is a plan view of the connector assembly according to the embodiment of the present invention.
Figure 5:
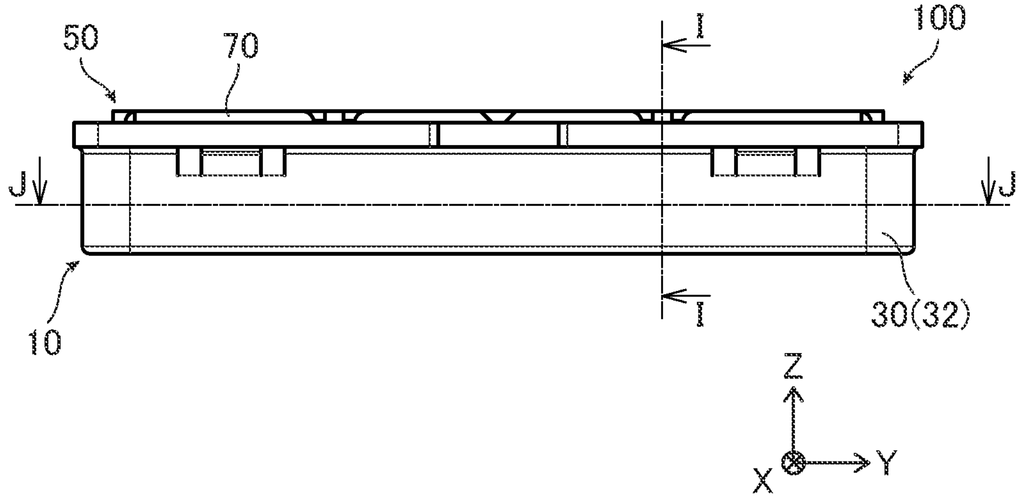
FIG. 5 is a side view of the connector assembly according to the embodiment of the present invention.

The frame 30 is a metal frame having a rectangular shape in a plan view, has an opening M at an upper end (one end in the Z direction) thereof, and supports the housing 20 disposed inside the frame 30 as shown in FIG. 1. At the time of connector fitting, the counter connector 50 enters an inside of the connector 10 through the opening M. Then, in the connector fitting state, the counter connector 50 is entirely accommodated in an inner space of the frame 30, and a side wall 32 of the frame 30 surrounds the counter connector 50 as shown in FIGS. 3, 4 and 7.

The blocking portions 41 are disposed between the pair of contacts 14, 14 in the Y direction, and in the embodiment, a plurality of blocking portions 41 are disposed between the pair of contacts 14, 14. To be more specific, one blocking portion 41 is disposed between the contact 14 held at the housing end portion 22 on the +Y side and the contact 12 held at the housing center portion 21. In addition, one blocking portion 41 is disposed between the contact 14 held at the housing end portion 22 on the −Y side and the contact 12 retained at the housing center portion 21.

The number of the blocking portions 41 is not particularly limited, and it suffices if at least one blocking portion 41 is disposed between the pair of contacts 14, 14 in the Y direction.

Each blocking portion 41 is connected to the ground potential. Specifically, a lower end of the blocking portion 41 (specifically, a lower surface of a joint portion 39 to be described later) is in contact with a grounding conductive pattern (not shown) formed in the board C to which the connector 10 is fixed. In the connector fitting state, each blocking portion 41 together with a counter blocking portion 80 included in the counter connector 50 constitutes the electromagnetic shield 120. The electromagnetic shield 120 suppresses crosstalk of signals, particularly high-frequency signals between the pair of contacts 14, 14.

(Counter Connector)

As shown in FIG. 2, the counter connector 50 has an appearance of a substantially rectangular shape in a plan view and extends longer in the Y direction than in the X direction. The counter connector 50 is configured to be symmetrical with respect to its center position in each of the X direction and the Y direction.

As shown in FIG. 2, the counter connector 50 includes signal transmitting counter contacts 52, 54, a counter housing 60 holding the counter contacts 52, 54, a counter frame 70 surrounding the counter housing 60, and counter blocking portions 80 each constituting the electromagnetic shield 120.

As many (in FIG. 2, six) counter contacts 52 as the number of the contacts 12 are held at a housing center portion 61 which is a center portion in the Y direction of the counter housing 60. The high-frequency signal transmitting counter contact 54 is singly held at each of end portions on the +Y side and the −Y side of the counter housing 60, i.e., each housing end portion 62. The counter contacts 52, 54 are disposed at positions separately corresponding to the contacts 12, 14 and, in the connector fitting state, are electrically connected to the corresponding contacts 12, 14. This configuration enables transmission of low frequency signals or high frequency signals between the connectors.

The counter housing 60 is a molded product made of an insulating resin material and is disposed inside the counter frame 70 while holding the counter contacts 52, 54. The counter frame 70 is a metal frame having a rectangular shape in a plan view and supports the counter housing 60 disposed inside the counter frame 70.

The counter blocking portion 80 together with the blocking portion 41 constitutes the electromagnetic shield 120 in the connector fitting state. The counter blocking portion 80 of the embodiment is made of a metal plate such as a brass or bronze plate, extends in the X direction as shown in FIG. 2, and is attached to the counter housing 60 by insert molding.

<<Detailed Configuration of Connector>>

A detailed configuration of the connector 10 is described with reference to FIGS. 8 to 17.

Figure 14:
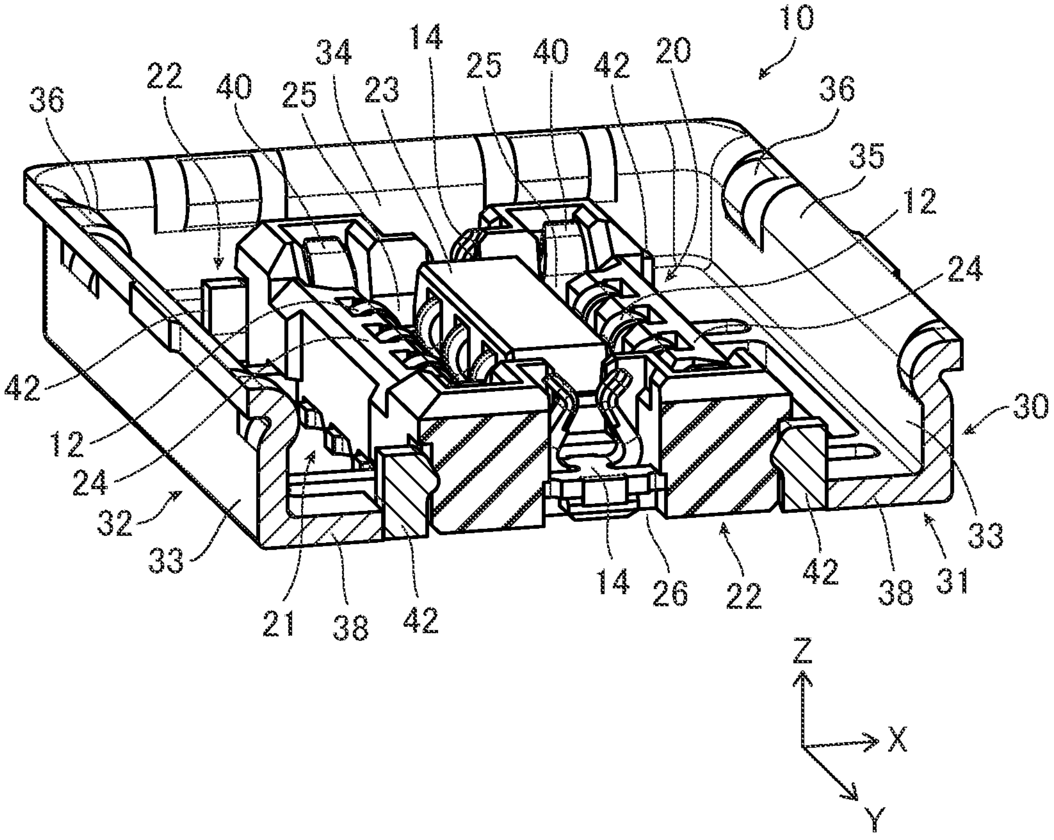
FIG. 14 is a cross-sectional view showing a state where a housing is pressed-fitted between two fixing protruding portions.
Figure 16:
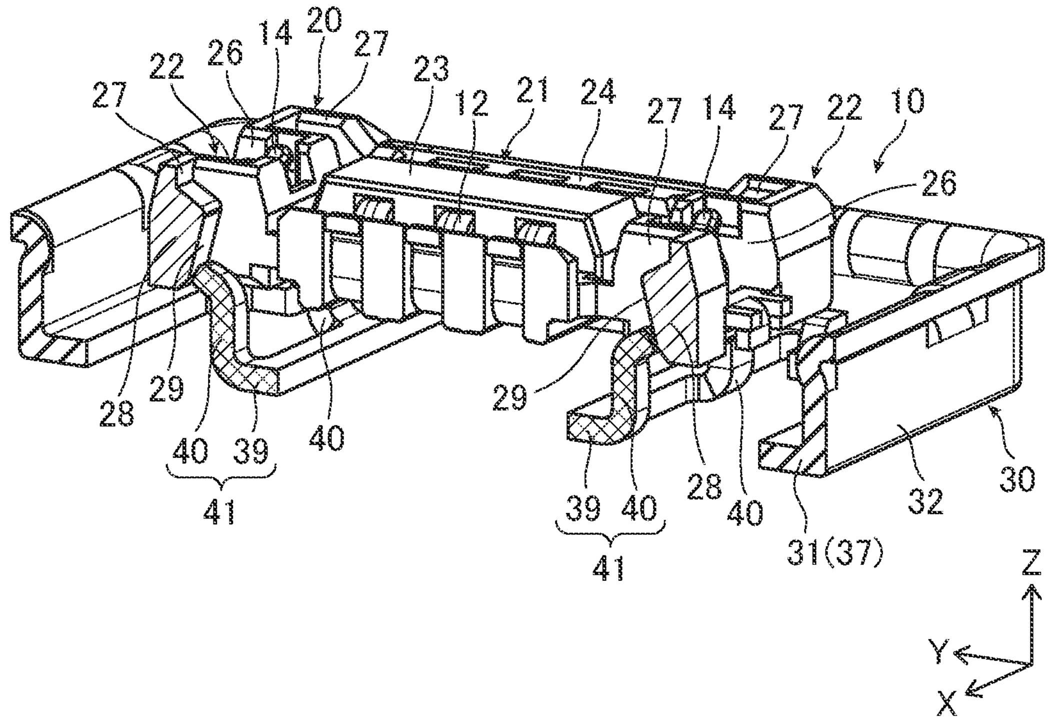
FIG. 16 is a view showing a process for assembling the connector and a cross-sectional view showing the connector in the middle of assembling.
Figure 17:
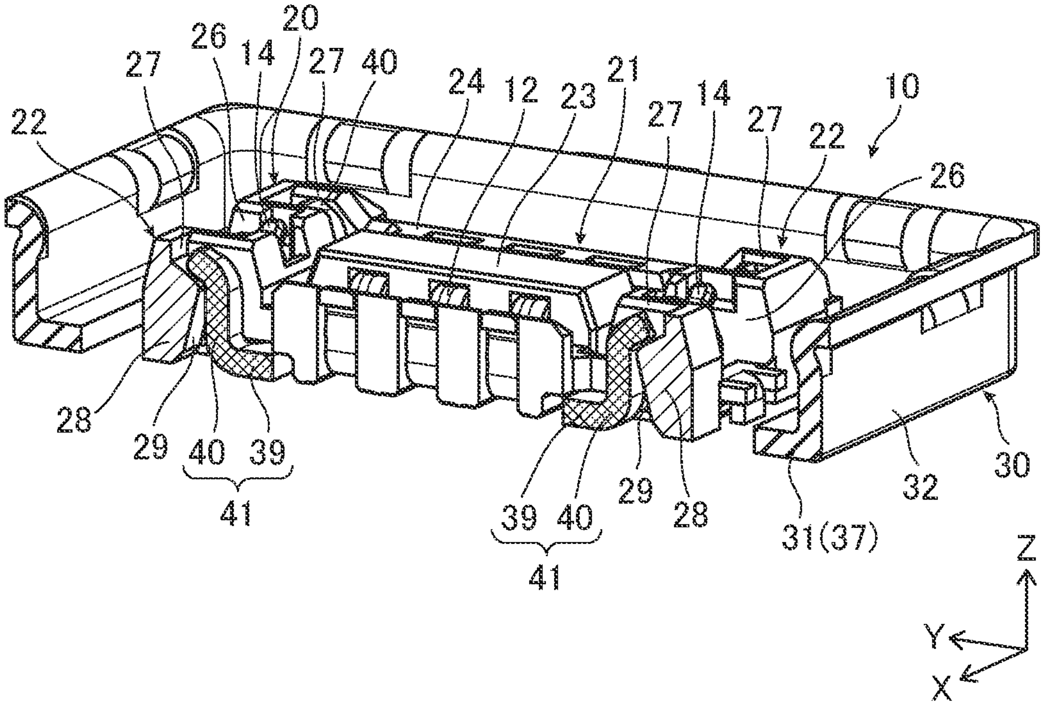
FIG. 17 is a view showing a process for assembling the connector and a cross-sectional view showing the connector in completion of assembling.

A cross-section shown in FIG. 14 is an XZ plane passing the fixing protruding portions 42. Each of cross-sections shown in FIGS. 16 and 17 is a YZ plane passing the projection portions 40 of the blocking portions 41.

Figure 8:
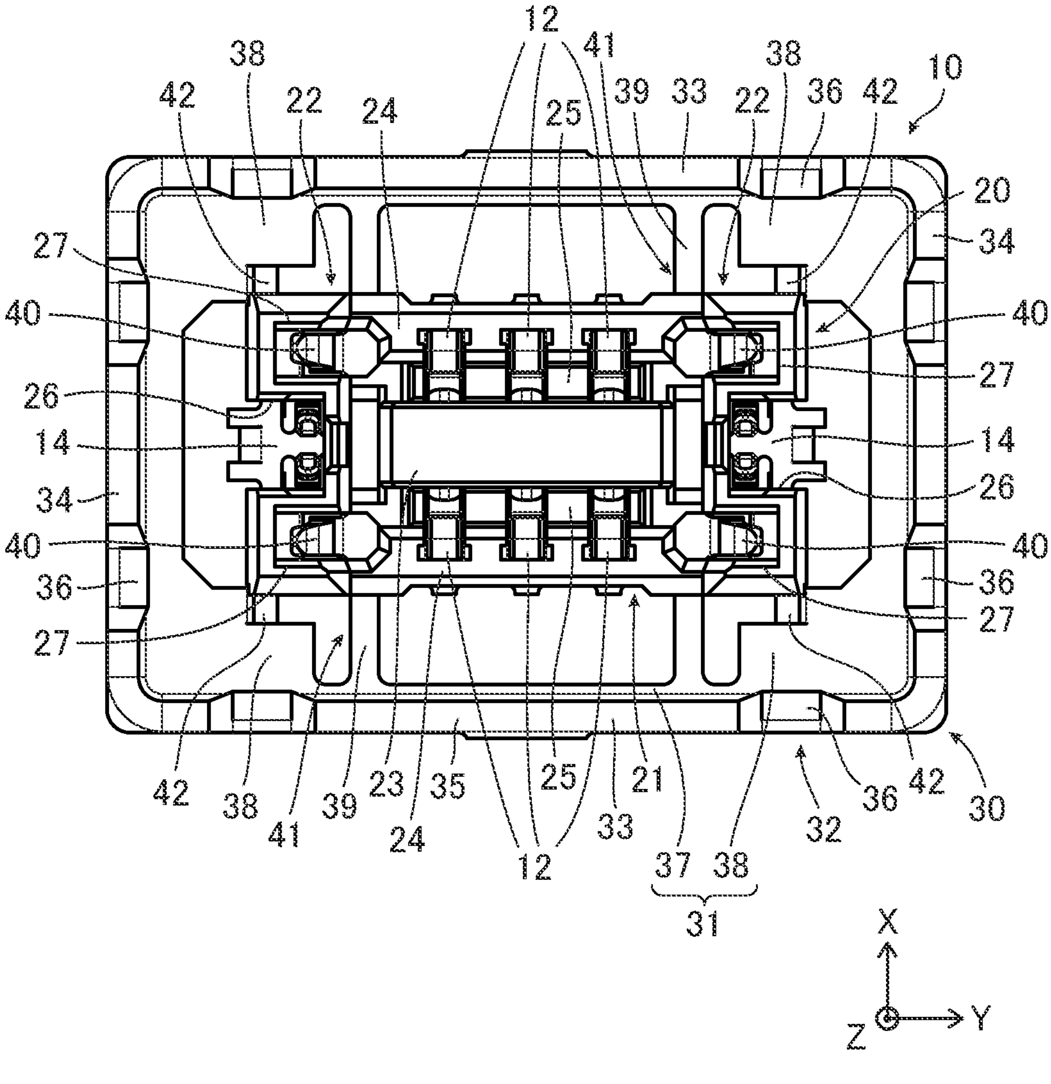
FIG. 8 is a plan view of the connector according to the embodiment of the present invention.
Figure 13:
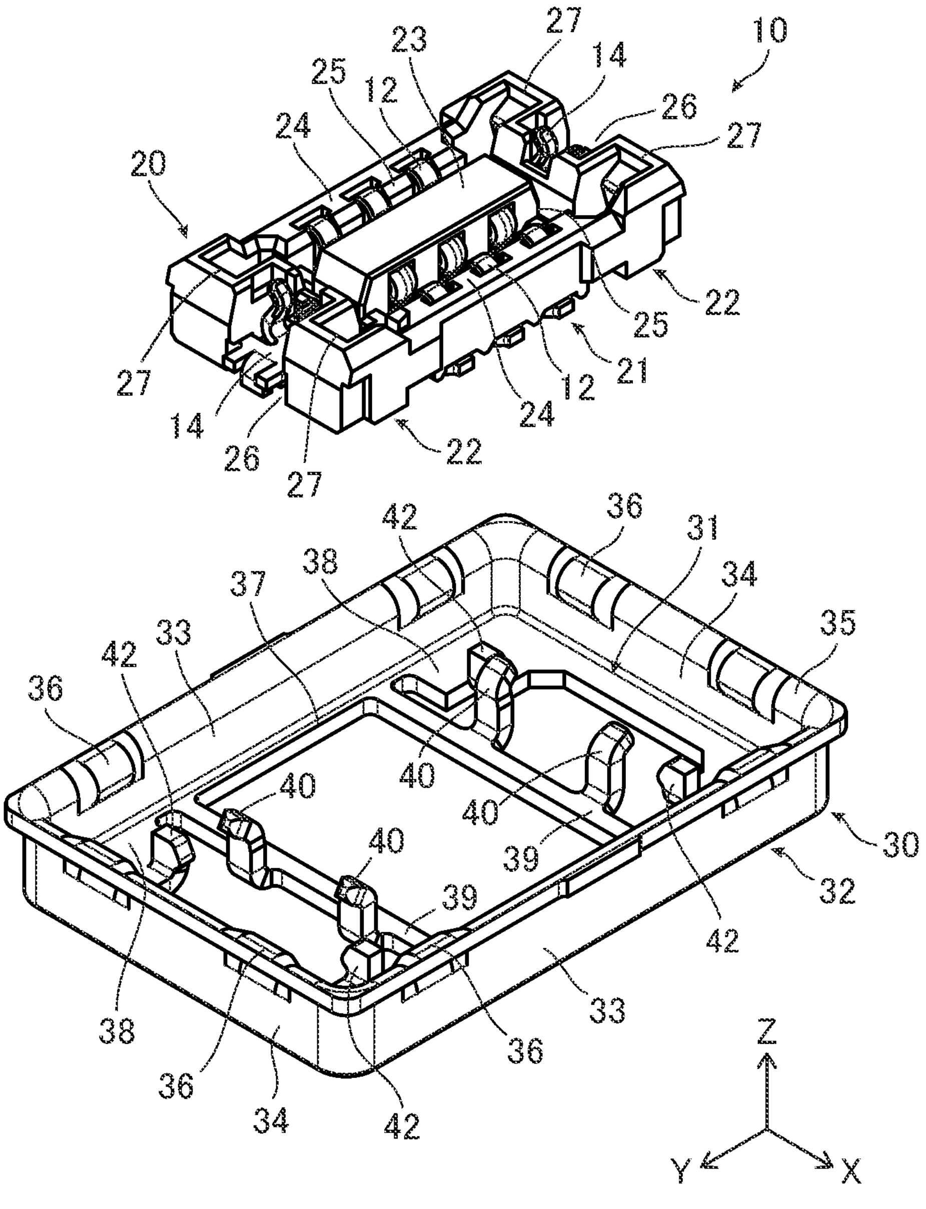
FIG. 13 is an exploded device view of the connector according to the embodiment of the present invention.

The housing 20 is divided into the housing center portion 21 and the housing end portions 22 on the +Y side and the −Y side. As shown in FIGS. 8 and 13, the housing center portion 21 includes a center protruding portion 23 and side protruding portions 24 situated on opposite sides of the center protruding portion 23 in the X direction. The center protruding portion 23 and the two side protruding portions 24 extend in the Y direction, and a fitting groove 25 is provided between the center protruding portion 23 and each of the side protruding portions 24. A plurality of contacts 12 are fitted in the fitting groove 25 at intervals in the Y direction.

Of the housing 20, each of the housing end portions 22 on the +Y side and the −Y side includes, at its center portion in the X direction, a fitting recess portion 26 formed to be dented to the Y-directional inner side as shown in FIGS. 8 and 13. Of the fitting recess portion 26, the Y-directional outer end is an opening end, while other ends are closed by wall surfaces rising vertically to the +Z side. As seen from FIGS. 12 and 13, the contact 14 is press-fitted into the fitting recess portion 26 by being pressed toward the Y-directional inner side.

Figure 9:
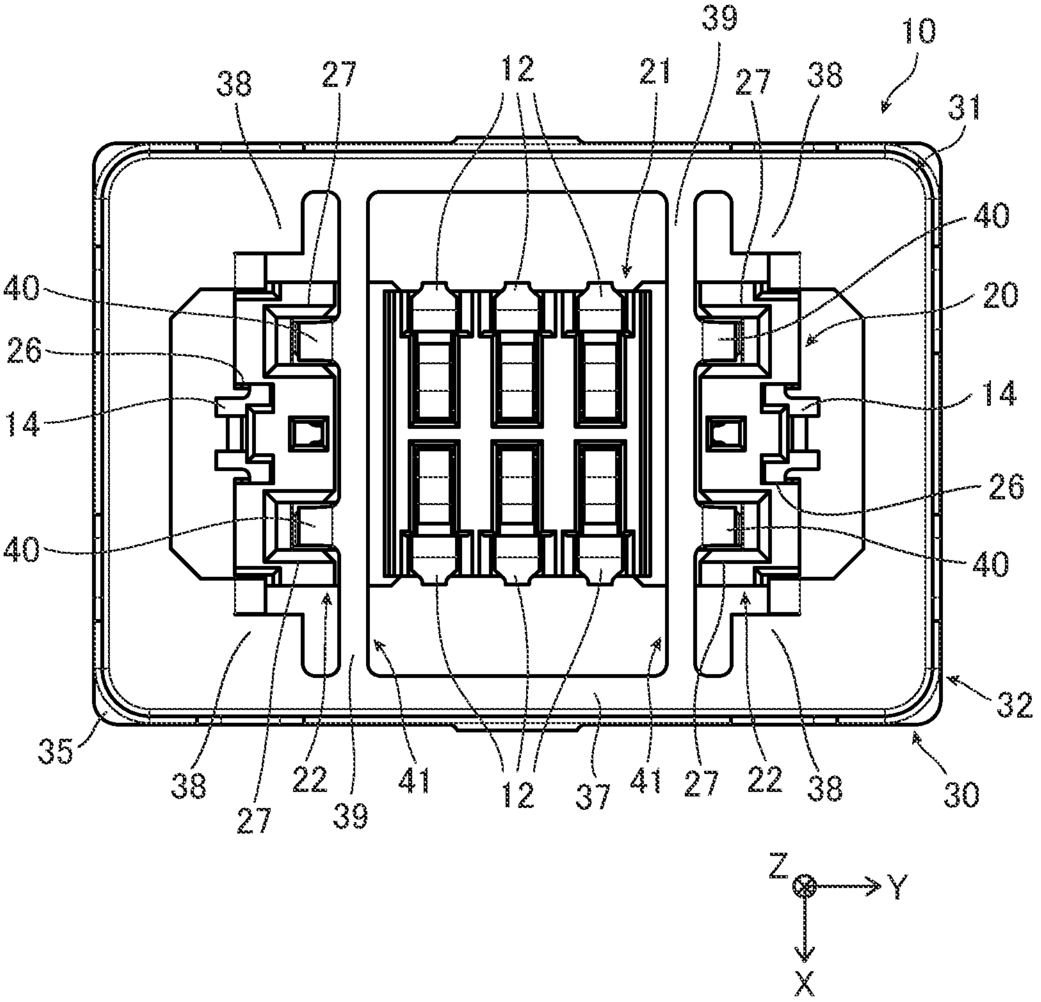
FIG. 9 is a bottom view of the connector according to the embodiment of the present invention.
Figure 10:
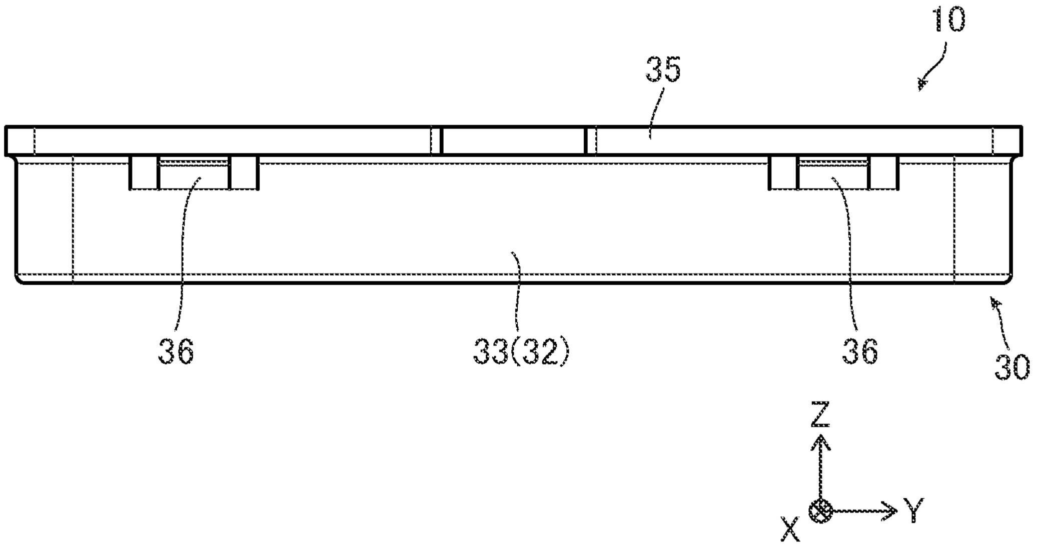
FIG. 10 is a side view of the connector according to the embodiment of the present invention.
Figure 11:
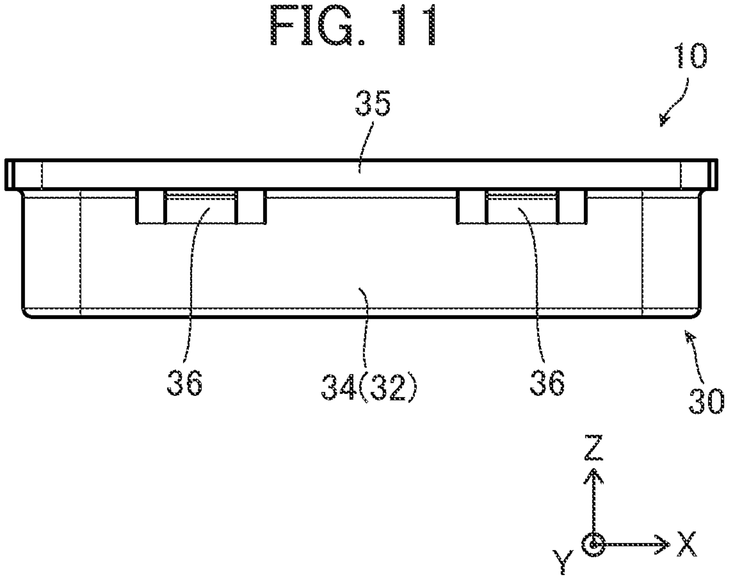
FIG. 11 is a front view of the connector according to the embodiment of the present invention.

As shown in FIGS. 8 and 13, each of the two housing end portions 22 is provided with engaging recess portions 27 formed to be dented to the Y-directional outer side. In the embodiment, each of the housing end portions 22 is provided with two engaging recess portions 27 which are separated from each other in the X direction. Of the engaging recess portion 27, the Y-directional inner side is an opening end, while other ends are closed by wall surfaces rising vertically to the +Z side. The projection portions 40 of the blocking portions 41 separately enter the engaging recess portions 27 as shown in FIGS. 9 and 12.

The frame 30 has conductivity and, when connected to the ground potential, exhibits shielding function, blocking an influence, specifically an electromagnetic interference from an outside to the contacts 12, 14. In the embodiment, the frame 30 extends longer in the Y direction than in the X direction.

As shown in FIGS. 8 to 14, the frame 30 includes a bottom wall 31 provided at an end portion on the opposite side from the opening M in the Z direction, i.e., a lower end portion thereof, and a side wall 32 rising from an outer periphery of the bottom wall 31 to the +Z side. The side wall 32 has a rectangular shape in a plan view and surrounds an outer surface of the housing 20 as shown in FIG. 8.

Figure 12:
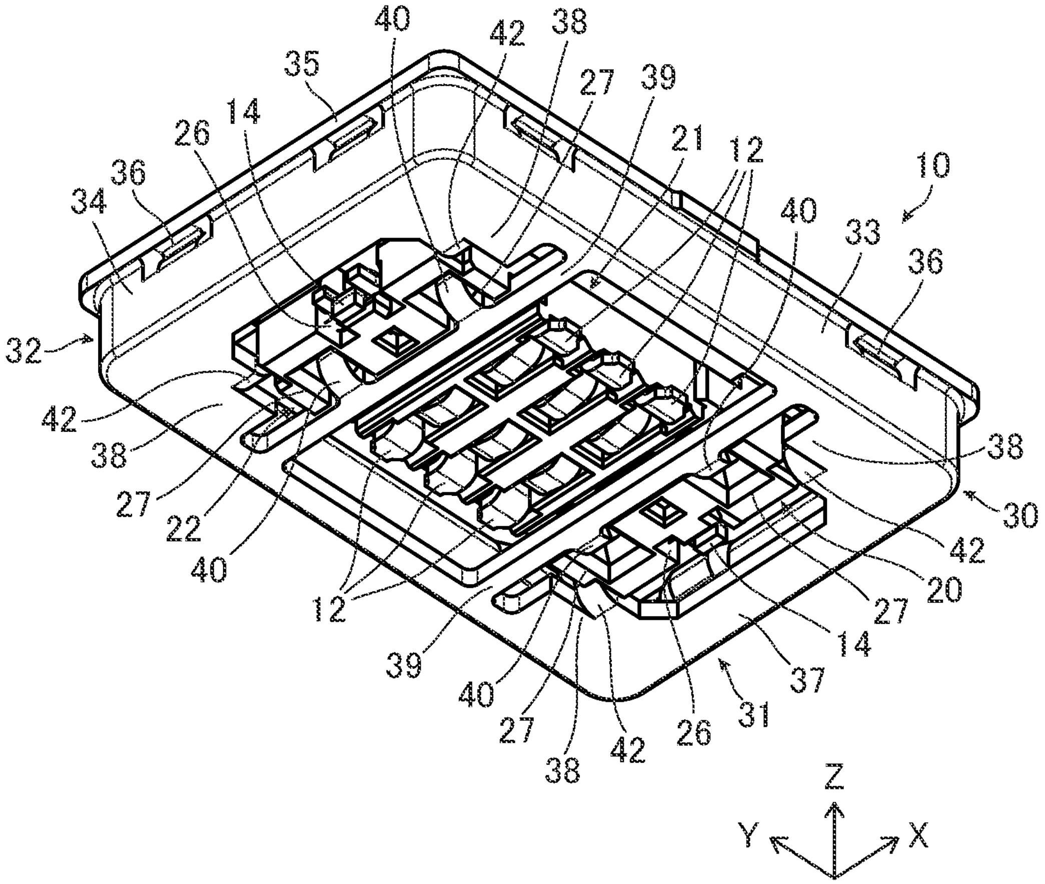
FIG. 12 is a perspective view of the connector according to the embodiment of the present invention when viewed from a lower side.

As shown in FIGS. 8 to 13, the side wall 32 includes a pair of long side portions 33 extending in the Y direction and a pair of short side portions 34 extending in the X direction. The pair of long side portions 33 and the pair of short side portions 34 are joined to one another without seam or gap as shown in FIGS. 8 and 12. In other words, the side wall 32 seamlessly continues over an entire periphery of the frame 30. The entire periphery of the frame 30 is an entire range in the circumferential direction of the frame 30, and the circumferential direction of the frame 30 is a direction surrounding the inner space of the frame 30, i.e., a direction along the edge of the inner space of the frame 30.

As shown in FIGS. 12 and 13, an upper end portion of the side wall 32 is bent toward an outside of the frame 30 to form a flange portion 35. The flange portion 35 is provided so as to surround the opening M in the frame 30. Since the flange portion 35 as above is provided at the upper end portion of the side wall 32, the counter connector 50 is suitably guided to an inside of the frame 30 at the time of connector fitting. As a result, the counter connector 50 is correctly positioned inside the frame 30 at the time when the connector fitting is completed.

In addition, an inner wall surface of the side wall 32 is partly provided with jut portions 36 jutting toward an inside of the frame 30 as shown in FIGS. 8 and 12. The jut portions 36 are formed by pressing a wall body of the side wall 32 inward. In the connector fitting state, of the inner wall surface of the side wall 32, the jut portions 36 are in contact with an outer peripheral surface of the counter connector 50, specifically an outer wall surface of the counter frame 70 (see FIG. 6).

The bottom wall 31 is made of a flat plate extending along an XY plane and, as shown in FIGS. 9 and 12, extends toward an inside of the frame 30. The housing 20 is placed on an upper surface of the bottom wall 31, and a lower surface of the bottom wall 31 is fixed to the board C. In the embodiment, the bottom wall 31 is fixed to the board C with solder while the entire lower surface is in contact with the board C. A means for fixing the bottom wall 31 and the board C is not limited to soldering, and fixing may be performed by, for example, welding.

As shown in FIGS. 9, 12 and 13, the bottom wall 31 of the embodiment is constituted of an edge portion 37, corner portions 38, and joint portions 39. The edge portion 37 is a portion with a narrow width provided along an outer periphery of the inner space of the frame 30 as shown in FIGS. 9 and 12. The corner portions 38 are present separately at four corners of the bottom portion of the frame 30, each taking a form of substantially rectangular piece.

The joint portion 39 is a portion extending in the X direction and joins one end portion to the other end portion of the bottom wall 31 in the X direction, specifically joins end portions on the +X side end and the −X side end of the edge portion 37. The joint portion 39 constitutes part of the bottom wall 31 and also constitutes part of the blocking portion 41. In other words, the blocking portion 41 has the joint portion 39 as its part.

In the embodiment, the joint portion 39 linearly extends in the X direction so as to pass through the shortest path in order to avoid an interference with components (for example, the housing center portion 21 and the housing end portions 22) situated around the joint portion 39. However, the invention is not limited thereto, and the joint portion 39 may extend while being curved in a circular arc shape with respect to the X direction, or extend while being meandered in the X direction.

As shown in FIGS. 9 and 12, a plurality of (specifically, two) joint portions 39 are provided to be separated from each other in the Y direction. The plurality of joint portions 39 are all disposed between the pair of contacts 14, 14 in the Y direction. To be more specific, one joint portion 39 is disposed between the contact 14 held at the housing end portion 22 on the +Y side and the contact 12 held at the housing center portion 21. In addition, one joint portion 39 is disposed between the contact 14 held at the housing end portion 22 on the −Y side and the contact 12 held at the housing center portion 21.

Each joint portion 39 constitutes part of the bottom wall 31 and is fixed to the board C while being in contact with the board C continuously in a range from an end portion on the +X side to an end portion on the −X side of the frame 30. In the embodiment, each joint portion 39 is fixed to the board C with solder continuously over a range from one end to the other end in its extending direction (i.e., the entire range from an end portion on the +X side to an end portion on the −X side).

As shown in FIGS. 9, 12 and 13, the projection portion 40 projects from the joint portion 39 toward the opening M side in the Z direction. The projection portion 40 is a metal piece having a substantially S shape in a side view, is continuous with the joint portion 39, and, together with the joint portion 39, constitutes the blocking portion 41. In the embodiment, two projection portions 40 project from each of the joint portions 39 on the +Y side and the −Y side.

The projection portion 40 projects from an end surface on the Y-directional outer side of the joint portion 39, is bent in an L shape, then extends toward the +Z side, and is again bent, at its tip portion (end portion on the +Z side), in an L shape toward the Y-directional outer side. The projection portion 40 has elasticity and, when pressed in the Y direction, elastically deforms so as to bend in the direction in which the projection portion 40 is pressed.

As shown in FIGS. 9, 12 and 13, the projection portion 40 enters the engaging recess portion 27 and is engaged with, of inner wall surfaces of the engaging recess portion 27, an inner wall surface situated on the Y-directional outer side. Specifically, as shown in FIGS. 16 and 17, a protruding portion protruding toward the Y-directional inner side (hereinafter, protruding portion 28 of the inner wall surface) is provided at the inner wall surface on the Y-directional outer side of the engaging recess portion 27. The protruding portion 28 of the inner wall surface is a protrusion portion having a substantially trapezoidal shape in a side view and has an inclined surface 29 at its lower end portion (end portion on the −Z side). The inclined surface 29 is inclined so as to be positioned inward in the Y direction as advancing toward the upper side thereof.

In the process of assembling the housing 20 with the frame 30, the projection portion 40 enters the corresponding engaging recess portion 27 from a lower opening end of the engaging recess portion 27. At this time, as shown in FIG.

16, the inclined surface 29 provided at the protruding portion 28 of the inner surface wall abuts the tip portion of the projection portion 40 to press the projection portion 40 toward the Y-directional inner side. In this manner, the projection portion 40 elastically deforms so as to bend toward the Y-directional inner side.

When the projection portion 40 further enters the engaging recess portion 27, the tip portion of the projection portion 40 moves upward along the protruding portion 28 of the inner wall surface, and consequently is mounted on an upper corner portion of the protruding portion 28. At this time, the projection portion 40 returns to an original state from the state of being elastically deformed to bend toward the Y-directional inner side, and displaces to the Y-directional outer side. As a result, the tip portion of the projection portion 40 catches on the upper corner portion of the protruding portion 28 of the inner wall surface, and the projection portion 40 is engaged with the inner wall surface on the Y-directional outer side of the engaging recess portion 27.

As shown in FIGS. 8 and 13, a fixing protruding portion 42 protruding toward the upper side (+Z side) is further provided near each of four corners of the bottom wall 31. The fixing protruding portion 42 is a columnar protruding portion, and a protrusion amount thereof from the upper surface of the bottom wall 31 is about 0.1 mm. Two fixing protruding portions 42 are disposed to be separated from each other in the X direction, and as shown in FIGS. 8 and 13, two fixing protruding portions 42 in a pair are provided on each of the +Y side and the −Y side.

The two fixing protruding portions 42 provided on each of the +Y side and the −Y side are configured to be symmetrical with each other with respect to the X-directional center of the connector 10. The two fixing protruding portions 42 are disposed at the same position in the Y direction. In addition, a gap between the two fixing protruding portions 42 in the X direction has substantially the same length as the lateral width of the housing end portion 22 of the housing 20. Furthermore, as shown in FIGS. 13 and 14, the X-directional inner end surface of the fixing protruding portion 42, i.e., an end surface situated on the side facing the other fixing protruding portion 42 in a pair bulges in a mountain-like shape.

In the embodiment, the housing 20 is attached to the frame 30 by the function of the fixing protruding portions 42 described above. Specifically, when the housing 20 is introduced into the frame 30 from the opening M side and is set to a predetermined position, the housing end portion 22 is press-fitted and held between the two fixing protruding portions 42 as shown in FIG. 14. The housing 20 is attached to the frame 30 in this manner.

Meanwhile, in the embodiment, the frame 30 and the blocking portions 41 are constituted of the same member for the purpose of reducing the number of components of the connector 10. Specifically, the bottom wall 31, the side wall 32, the blocking portions 41, and the fixing protruding portions 42 are integrally formed of the same member, specifically constituted of the same metal sheet to be integrated with one another.

To be more specific, the frame 30 shown in FIGS. 8 to 13 is produced from a single metal sheet. The material of a metal sheet is not particularly limited, and for example, a copper alloy such as brass and bronze or stainless steel is available. The sheet thickness of a metal sheet is not particularly limited, and is set to 0.06 mm to 0.15 mm, for example.

Figure 15:
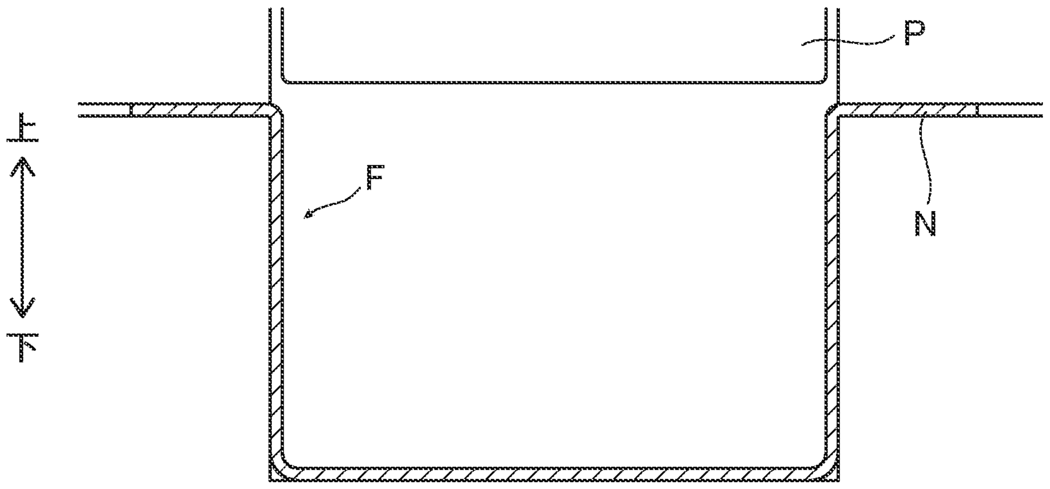
FIG. 15 is an illustrative view of drawing process.

The frame 30 is, for example, produced by having the metal sheet N subjected to drawing process (more precisely, square tube drawing process) as shown in FIG. 15. Specifically, an outer edge portion of the metal sheet N is sandwiched and held by dice or the like, and of the metal sheet N, a portion situated inside the outer edge portion is pressed by a pressing device P such as a punch. Thus, as shown in FIG. 15, a frame base F that is a metal molded product of rectangular tube shape having a drawn bottom portion is obtained. The drawn bottom portion is a portion situated at the deepest portion (bottom portion) of the portion formed by pressing the metal sheet N during the drawing process.

In the frame base F, an opening is formed on the top surface side where the pressing device P pressed, and this opening becomes the opening M at the time of completion of the frame 30. A rectangular tube portion of the frame base F becomes the side wall 32 at the time of completion of the frame 30. The side wall 32 thus formed seamlessly continues over the entire periphery of the frame 30, and the strength and the blocking property (shielding property) are ensured. Of the metal sheet N, the outer edge portion which was sandwiched during the drawing process remains as a jaw-like edge portion at the top surface side of the frame base F and becomes the flange portion 35 at the time of completion of the frame 30.

After the drawing process is performed, a large part of the drawn bottom portion is punched out. After the punching, a portion constituting the edge portion 37, the corner portions 38, and the joint portions 39, a portion constituting the projection portions 40, and a portion constituting the fixing protruding portions 42 remain in the drawn bottom portion. In this stage, a portion constituting the joint portions 39 and the portion constituting the projection portions 40 are continuously joined to each other in the Y direction. In addition, a portion constituting the corner portions 38 and the portion constituting the fixing protruding portions 42 are continuously joined to each other in the X direction.

Thereafter, the drawn bottom portion (i.e., metal sheet N) is bent at a boundary position between the joint portions 39 and the projection portions 40, specifically, the portion constituting the projection portions 40 is bent at substantially 90° with respect to the joint portions 39 so as to rise. The rising portion is bent in the substantially S shape to form the projection portions 40.

An inner end portion in each corner portion 38 is subjected to cutting and bending process so as to be bent at substantially 90° with respect to the corner portion 38 and rise, thereby forming the fixing protruding portion 42.

As above, in the embodiment, the bottom wall 31 and the side wall 32 of the frame 30, the projection portions 40 of the blocking portions 41, and the fixing protruding portions 42 are formed from a single metal sheet N, are all integrated, and are seamlessly joined to one another. Note that the fixing protruding portion 42 may be configured as a separate component from the frame 30.

As above, since the frame 30 and the blocking portions 41 are integrated with one another in the embodiment, the number of components of the connector 10 is smaller than that in the configuration in which these portions are divided into separate components.

To be more specific, when the frame 3 of the connector 1 described in Patent Literature 1 is produced by drawing process, a surface which was pressed by the pressing device P during the process, i.e., a surface on which a flange portion is formed is fixed to a board. On the other hand, a drawn bottom portion formed by being pressed by the pressing device P is punched out, and its punched hole becomes the opening 2 for fitting the counter connector to an inside of the frame 3. When the blocking portion 5 is provided inside the frame 3 produced in this manner, a component constituting the blocking portion 5 is prepared separately from the frame 3 and installed to an end portion on the board side of the frame 3.

On the other hand, while the frame 30 of the connector 10 of the present invention is produced by drawing process, a surface which was pressed by the pressing device P during the process is treated as the upper surface, and the drawn bottom portion is treated as the lower end portion. In this configuration, since the blocking portion 41 is formed by use of part of the drawn bottom portion, it is not necessary to form the blocking portion 41 as a separate component, so that the number of components is reduced accordingly.

When the frame 3 included in the connector 1 described in Patent Literature 1 is produced by drawing process, the drawn bottom portion is punched out to form the opening 2 for fitting the counter connector. At this time, it is necessary to punch out a hole having a relatively large size corresponding to the dimension of the counter connector.

On the other hand, in the frame 30 of the connector 10 of the present invention, the opening formed by pressing by the pressing device P during the drawn process is used as it is as the opening M for fitting the counter connector 50. As a result, it is not necessary to largely punch out the drawn bottom portion in order to ensure the opening M, and the frame 30 having the opening M with a required size can be easily produced by drawing process.

According to the frame 30 of the connector 10 of the present invention, since the side wall 32 seamlessly continues over the entire periphery of the frame 30, the strength and the blocking property (shielding property) of the frame can be ensured.

Further, according to the frame 30 of the connector 10 of the invention, the joint portion 39 which joins the end portion on the +X side to the end portion on the −X side of the bottom wall 31 is fixed to the board C with solder while being in contact with the board C over the entire range in its extending direction. With this configuration, the strength of the connector 10 can be more enhanced. To be more specific, a force to displace the connector 10 in a direction rotating about a Z axis (direction shown by bold arrows in FIG. 4) may act on the connector 10. This rotating force tends to act on the side wall 32 of the frame 30, specifically act along the X direction on portions near the corners of the side wall 32. On the other hand, in the connector 10 of the present invention, the joint portion 39 continues long along the X direction, and is fixed to the board C over the range from one end to the other end in the extending direction of the joint portion 39. Therefore, the joining force between the joint portion 39 and the board C is sufficiently ensured, so that the connector 10 can appropriately resist (withstand) the above-described rotating force.

In the embodiment, the bottom wall 31 and the side wall 32 are integrated with each other in the frame 30, i.e., the side wall 32 and the joint portion 39 are joined to each other, precisely, are continuous with each other via the edge portion 37. In this case, the joint portion 39 fixed to the board C can appropriately withstand the rotating force acting on the side wall 32 of the frame 30.

To be more specific, if the side wall 32 and the joint portion 39 are separately constituted of members different from each other, the rotating force acting on the side wall 32 is easily dispersed, and the joint portion 39 separated from the side wall 32 hardly receives the rotating force. On the other hand, when the side wall 32 and the joint portion 39 are continuous with each other, dispersion of a rotating force is suppressed. As a result, the joint portion 39 appropriately receives a rotating force and can resist the force appropriately.

<<Constitutional Components of Counter Connector and Connector Fitting State>>

The constitutional components of the counter connector 50 and the connector fitting state are described in detail with reference to FIGS. 18 and 19. FIG. 19 is a cross-sectional view showing the electromagnetic shield 120, and this cross-section is a YZ plane passing the projection portion 40 of the blocking portion 41 and the projection portion (counter projection portion 83) of the counter blocking portion 80.

The counter housing 60 included in the counter connector 50 is divided into the housing center portion 61 and the housing end portions 62 on the +Y side and the −Y side. The housing center portion 61 has two contact holding portions 63 extending in the Y direction as shown in FIG. 18. The two contact holding portions 63 are disposed with a gap therebetween in the X direction and each hold the plurality of counter contacts 52.

Figure 18:
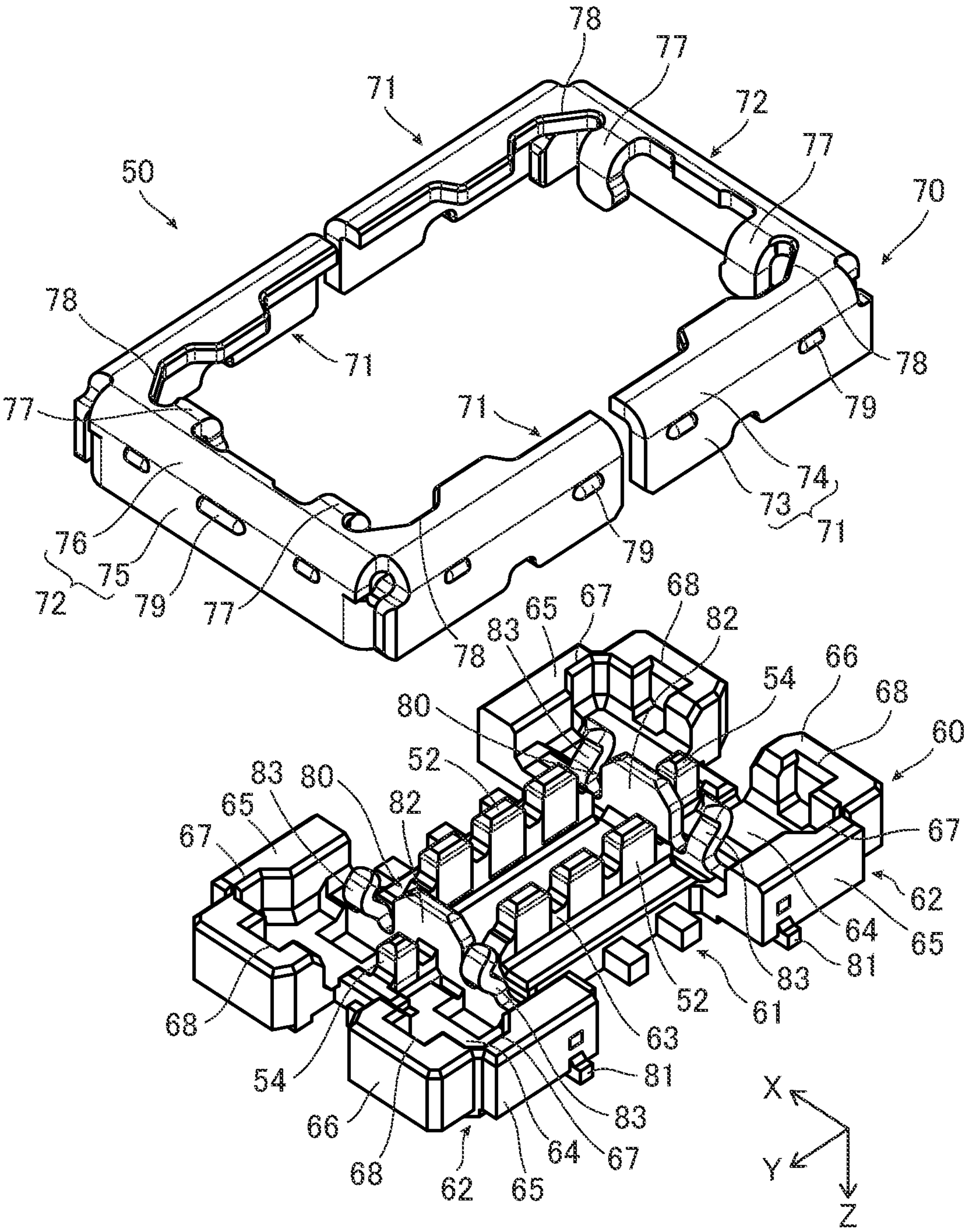
FIG. 18 is an exploded device view of the counter connector according to the embodiment of the present invention.
Figure 19:
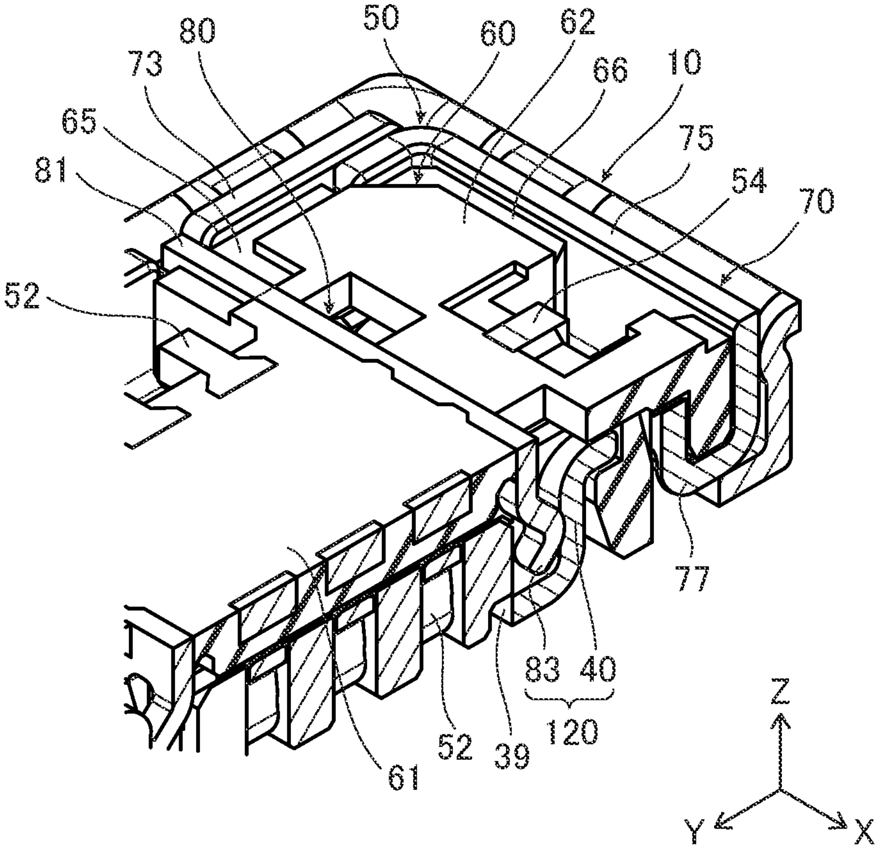
FIG. 19 is a cross-sectional view showing a structure of an electromagnetic shield.

As shown in FIG. 18, the housing end portion 62 includes a contact holding portion 64 and side walls 65, 66 situated outside the contact holding portion 64. The contact holding portion 64 has a dent formed on the Y-directional inner side, and the counter contact 54 is press-fitted into the dent. The side wall 65 is disposed upright on an edge portion on the X-directional outer side of the housing end portion 62. The side wall 66 is disposed upright on an edge portion on the Y-directional outer side of the housing end portion 62, and two side walls 66 are provided in the X direction to sandwich therebetween the dent into which the counter contact 54 is press-fitted.

In addition, as shown in FIG. 18, the side wall 65 is provided with a side wall recess portion 67 formed to be dented to the X-directional outer side. In addition, as shown in FIG. 18, the side wall 66 is provided with an engaging recess portion 68 formed to be dented to the Y-directional outer side.

The counter frame 70 is made of a metal sheet, for example, a sheet material made of a copper alloy such as brass and bronze or stainless steel. In the embodiment, as shown in FIG. 18, two pieces each shaped in a substantially C shape in a plan view are disposed such that their end on the lip side face each other to thereby constitute the counter frame 70. However, the invention is not limited thereto, and the counter frame 70 may be a single continuous body and an inseparable frame.

As shown in FIG. 18, each of the two pieces constituting the counter frame 70 includes a pair of first wall portions 71 arranged in parallel with a gap therebetween in the X direction, and a second wall portion 72 situated between the pair of first wall portions 71 in the X direction. Each of the first wall portions 71 includes an extending wall 73 vertically rising in the Z direction and extending in the Y direction, and a curved wall 74 curved in a circular arc shape from an end on the −Z side of the extending wall 73 toward the X-directional inner side.

As shown in FIG. 18, a cutout having a trapezoidal shape in a plan view is formed at a portion situated on the X-directional inner side of an end portion on the Y-directional outer side of the curved wall 74. The cutout is provided for preventing the fixing protruding portion 42 of the connector 10 from being interfered with the first wall portion 71 of the counter frame 70 in the connector fitting state.

Of the curved wall 74, the portion where the cutout is formed restricts position deviation in the X direction and the Y direction of the counter connector 50 in the connector fitting state. In other words, the portion where the cutout is formed in the curved wall 74 constitutes a restriction portion 78 restricting displacement of the counter connector 50.

As shown in FIG. 18, the restriction portion 78 is provided near each of four corners, i.e., near each of corners of the counter frame 70. To be more specific, the restriction portion 78 provided on the +Y side is provided at a position closer to the corner on the +Y side of the counter connector 50 than the counter blocking portion 80 on the +Y side is. The restriction portion 78 provided on the −Y side is provided at a position closer to the corner on the −Y side of the counter connector 50 than the counter blocking portion 80 on the −Y side is.

As shown in FIG. 18, the second wall portion 72 includes an extending wall 75 vertically rising in the Z direction and extending in the X direction, and a curved wall 76 curved in a circular arc shape from the −Z side end of the extending wall 75 toward the Y-directional inner side. As shown in FIG. 18, the curved wall 76 is provided with an engaging piece portion 77 which is curved from a Y-directional inner end of the curved wall 76 to the −Z side in a reversed J shape. The engaging piece portion 77 is inserted into the engaging recess portion 68, whereby the counter frame 70 is assembled with the counter housing 60. As shown in FIG. 18, each of the first wall portion 71 and the second wall portion 72 is provided with a protrusion portion 79 jutting from an outer surface of the extending wall 73 or 75 in a bead shape.

The counter blocking portions 80 are disposed at a plurality of positions in the Y direction. To be more specific, one counter blocking portion 80 is disposed between the counter contact 54 held at the housing end portion 62 on the +Y side and the counter contact 52 held at the housing center portion 61. In addition, one counter blocking portion 80 is disposed between the counter contact 54 held at the housing end portion 62 on the −Y side and the counter contact 52 held at the housing center portion 61.

The counter blocking portion 80 is provided at its end portion on the −Z side with an extending portion 81 linearly extending in the X direction (see FIG. 6). A center projection portion 82 in a tongue-like shape vertically projects from the X-directional center portion of the extending portion 81 to the −Z side (see FIG. 6).

On opposite sides in the X direction of the center projection portion 82, counter projection portions 83 projecting to the −Z side as curving are separately provided as shown in FIG. 18. The counter projection portion 83 is a projection piece whose tip portion is bent in a lying V shape, has elasticity, and, when pressed in the Y direction, elastically deforms so as to bend in the direction in which the counter projection portion 83 is pressed. The counter blocking portion 80 is provided on the outer side of the counter projection portion 83 in the X direction with a projection end portion 84 projecting from an end surface on the −Z side of the extending portion 81 (see FIG. 6).

The counter connector 50 thus configured enters an inside of the frame 30 of the connector 10, whereby the connector 10 is fitted with the counter connector 50. In the connector fitting state, the counter frame 70 is in contact with the inner wall surface of the side wall 32 of the frame 30 via the protrusion portion 79 (see FIG. 6). In addition, the frame 30 is in contact with the outer wall surface of the counter frame 70 via the jut portion 36 (see FIG. 6).

In the connector fitting state, as shown in FIG. 19, each of the two counter projection portions 83 included in the counter blocking portion 80 is in contact with the projection portion 40 of the corresponding blocking portion 41. Thus, the blocking portion 41 and the counter blocking portion 80 constitute the electromagnetic shield 120. Here, the projection portion 40 and the counter projection portion 83 come into contact with each other in the Y direction while elastically deforming in the Y direction. Thus, a contact state between the projection portion 40 and the counter projection portion 83 becomes stable, and the electromagnetic shield 120 is satisfactorily maintained.

Since the projection portion 40 and the counter projection portion 83 can elastically deform in the Y direction, even after the counter projection portion 83 comes into contact with the projection portion 40 in the connector fitting state, the counter connector 50 can enter an inside of the frame 30 in the Z direction smoothly (without requiring a force).

Figure 20:
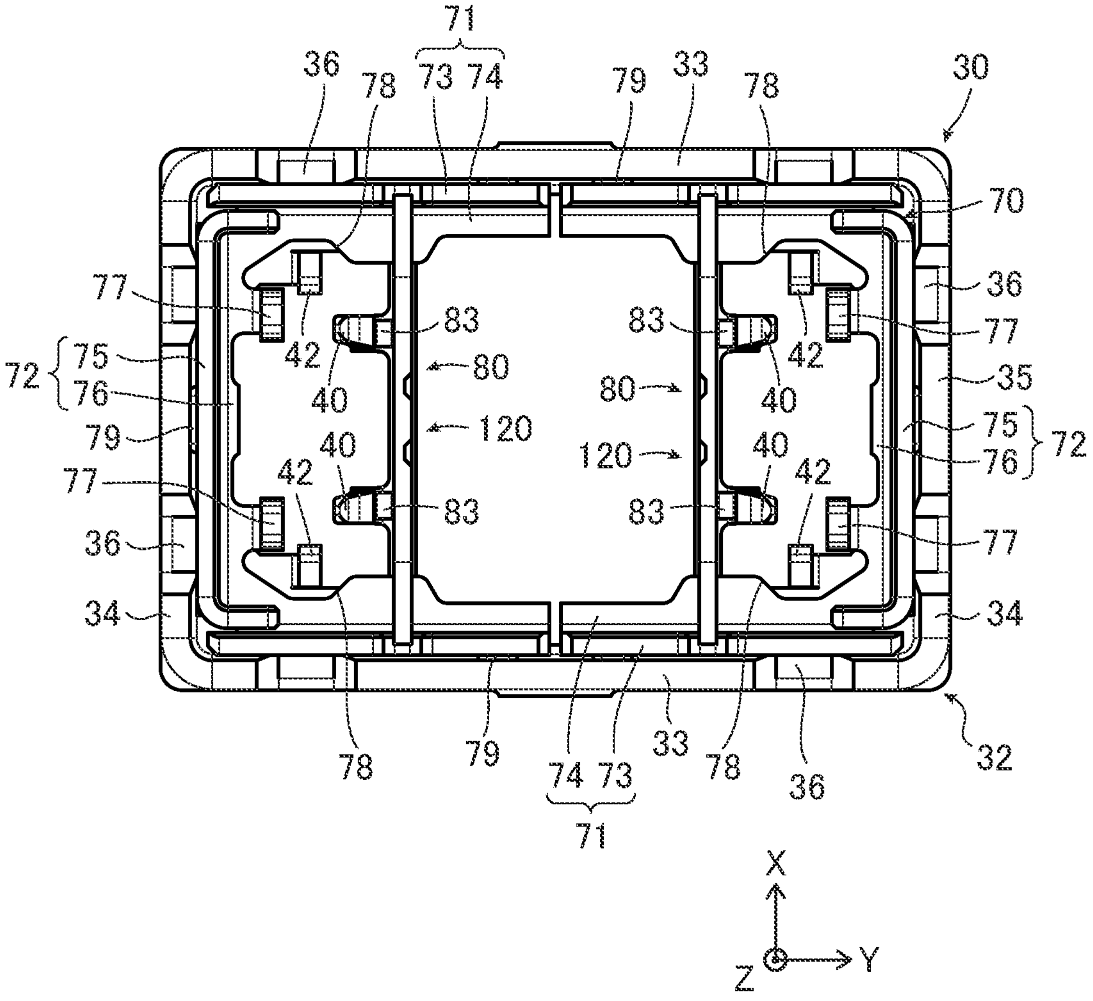
FIG. 20 is a plan view of the connector and the counter connector in a connector fitting state, with housings and contacts being omitted.
Figure 21:
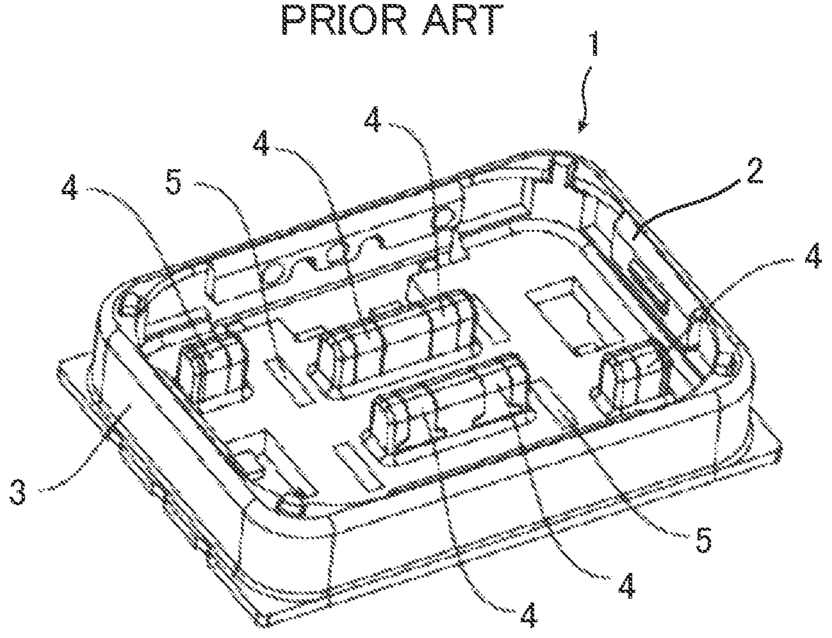
FIG. 21 PRIOR ART
FIG. 21 is a perspective view of a connector according to one conventional example.
Figure 22:
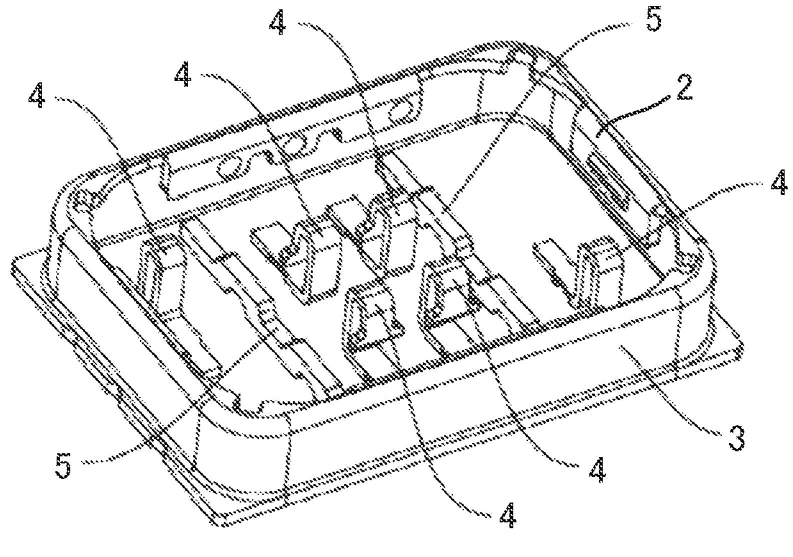
FIG. 22 PRIOR ART
FIG. 22 is a perspective view showing a frame and blocking portions which are included in a connector according to one conventional example.

In the connector fitting state, as shown in FIG. 20, the two fixing protruding portions 42 disposed on each of the +Y side and the −Y side in the connector 10 individually face the restriction portions 78 provided in the counter frame 70. Specifically, the restriction portions 78 are each disposed in an outside of the fixing protruding portion 42 in the X direction, and the fixing protruding portion 42 and the edge of the restriction portion 78 are adjacent to each other with a slight clearance therebetween.

With the above configuration, in the connector fitting state, the restriction portion 78 restricts displacement in the X direction of the counter connector 50 with respect to the connector 10, specifically, displacement to the direction of the arrows shown in FIG. 4. Specifically, the restriction portion 78 situated on the same side as the direction in which the counter connector 50 displaces when viewed from the fixing protruding portion 42 comes into contact with and is engaged with the fixing protruding portion 42 in the X direction. Thus, displacement of the counter connector 50 is restricted. As a result of restricting displacement of the counter connector 50, deformation, damages and the like of the counter connector 50 caused by such displacement can be suppressed.

<<Other Embodiments>>

While the connector and the connector assembly of the invention have been described above with reference to a specific example, the foregoing embodiment is mere an example used to facilitate the understanding of the invention, and there may be other embodiments.

While the example in which the frame 30 having a seamless structure is produced by drawing process is described in the foregoing embodiment, the invention is not limited to this, and other processing method may be used as long as the frame 30 having a seamless structure can be produced. For example, machining, another type of drawing, or other methods may be used.

The frame 30 may be produced by casting, die casting or other methods. In this case, the invention is not limited to the configuration in which the projection portion 40 projects from a side end surface (end surface on the Y-directional outer side) of the joint portion 39, and a configuration in which the projection portion 40 projects from an upper end surface (end surface on the +Z side) of the joint portion 39 may be adopted.

In the foregoing embodiment, the bottom wall 31 of the frame 30 is provided with the edge portion 37 with narrow width and having a rectangular shape, and the joint portion 39 joins the end portion on the +X side and the end portion on the −X side of the edge portion 37. However, the invention is not limited thereto, and the edge portion 37 may not be provided in the frame 30. In this case, the joint portion 39 would be directly joined to the end portion on +X side (i.e., long side portion 33 on the +X side) and the end portion on the −X side (i.e., long side portion 33 on the −X side) of the side wall 32.

In addition, while the outer shape of each of the frame 30 and the counter frame 70 is a rectangular shape in a plan view in the foregoing embodiment, the invention is not limited thereto, and the shape may be a circular shape, another quadrilateral shape than a rectangular shape such as a trapezoidal shape or a rhomboid shape, or a polygonal shape other than a rectangular shape.

What is claimed is:

1. A connector which can be fitted with a counter connector in a first direction and is fixed to a board, the connector comprising:

a frame including a side wall which surrounds the counter connector in a state where the connector is fitted with the counter connector;

a first terminal and a second terminal which are situated inside the frame and separately disposed at positions different from each other in a second direction intersecting the first direction; and a blocking portion which is disposed between the first terminal and the second terminal in the second direction, wherein the side wall seamlessly continues over an entire periphery of the frame, wherein the frame and the blocking portion are constituted of a same member to be integrated with each other, wherein the blocking portion has a joint portion which joins one end portion to another end portion of the frame in a third direction intersecting each of the first direction and the second direction, and wherein the joint portion is fixed to the board while being in contact with the board continuously from the one end portion to the other end portion of the frame.

2. The connector according to claim 1, wherein the joint portion extends in the third direction and is fixed to the board with solder continuously in a range from one end to the other end in the extending direction of the joint portion.

3. The connector according to claim 1, wherein the joint portion linearly extends in the third direction.

4. The connector according to claim 3, wherein the frame has an opening at its one end in the first direction and a bottom wall at its end portion on an opposite side from the opening in the first direction, wherein the counter connector enters an inside of the frame from the opening and is fitted with the connector, and wherein the joint portion constitutes part of the bottom wall and joins one end portion to another end portion of the bottom wall in the third direction.

5. The connector according to claim 4, wherein the side wall, the bottom wall, and the blocking portion are constituted of a same member and seamlessly joined to one another.

6. The connector according to claim 1, wherein the frame has an opening at its one end in the first direction and a bottom wall at its end portion on an opposite side from the opening in the first direction, wherein the counter connector enters an inside of the frame from the opening and is fitted with the connector, and wherein the joint portion constitutes part of the bottom wall and joins one end portion to another end portion of the bottom wall in the third direction.

7. The connector according to claim 6, wherein the side wall, the bottom wall, and the blocking portion are constituted of a same member and seamlessly joined to one another.

8. The connector according to claim 6, wherein the blocking portion has a projection portion which projects from the joint portion toward a side of the opening in the first direction, and wherein, in the state where the connector is fitted with the counter connector, the projection portion is in contact with a counter blocking portion included in the counter connector in the second direction, whereby the blocking portion and the counter blocking portion constitute an electromagnetic shield.

9. The connector according to claim 8, wherein the side wall, the bottom wall, and the blocking portion are constituted of a same metal sheet, wherein the joint portion and the projection portion are continuous with each other, and wherein the projection portion is formed by bending the metal sheet at a boundary position between the joint portion and the projection portion.

10. The connector according to claim 6, wherein the frame has an opening at its one end in the first direction and a bottom wall at its end portion on an opposite side from the opening in the first direction, wherein the counter connector enters an inside of the frame from the opening and is fitted with the connector, and wherein the joint portion constitutes part of the bottom wall and joins one end portion to another end portion of the bottom wall in the third direction.

11. The connector according to claim 10, wherein the side wall, the bottom wall, and the blocking portion are constituted of a same member and seamlessly joined to one another.

12. The connector according to claim 1, wherein the frame has conductivity, wherein the first terminal and the second terminal are contacts for high frequency signal transmission, and wherein a plurality of the blocking portions are disposed between the first terminal and the second terminal in the second direction.

13. The connector according to claim 1, wherein the blocking portion is connected to a ground potential.

14. A connector assembly configured such that a connector fixed to a board is fitted with a counter connector in a first direction, the connector assembly comprising:

a frame including a side wall which surrounds the counter connector in a state where the connector is fitted with the counter connector;

a first terminal and a second terminal which are situated inside the frame and separately disposed at positions different from each other in a second direction intersecting the first direction; and a blocking portion which is disposed between the first terminal and the second terminal in the second direction, wherein the side wall seamlessly continues over an entire periphery of the frame, wherein the frame and the blocking portion are constituted of a same member to be integrated with each other, wherein the blocking portion has a joint portion which joins one end portion to another end portion of the frame in a third direction intersecting each of the first direction and the second direction, and wherein the joint portion is in contact with the board continuously over a range from the one end portion to the other end portion of the frame.

* * * * *